Oct. 17, 1933.    D. F. SPROUL    1,930,695
CUSHIONING DEVICE
Filed July 7, 1931    2 Sheets-Sheet 1
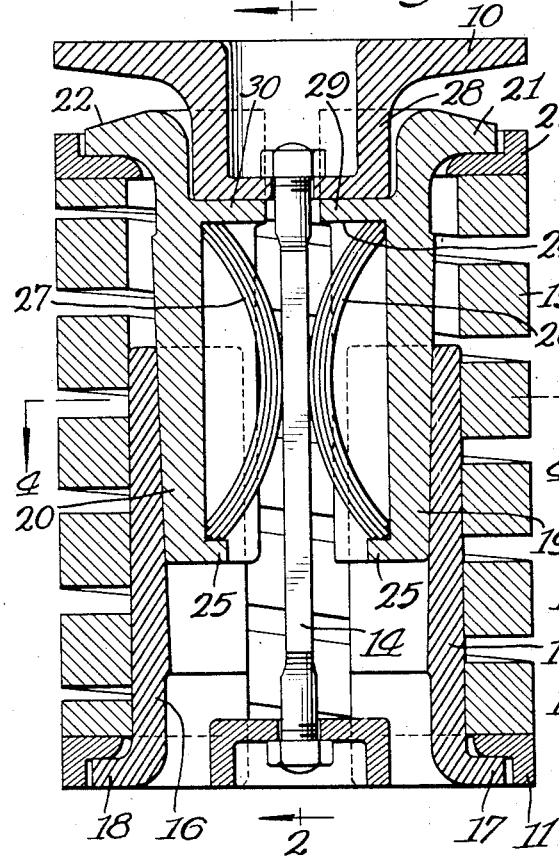
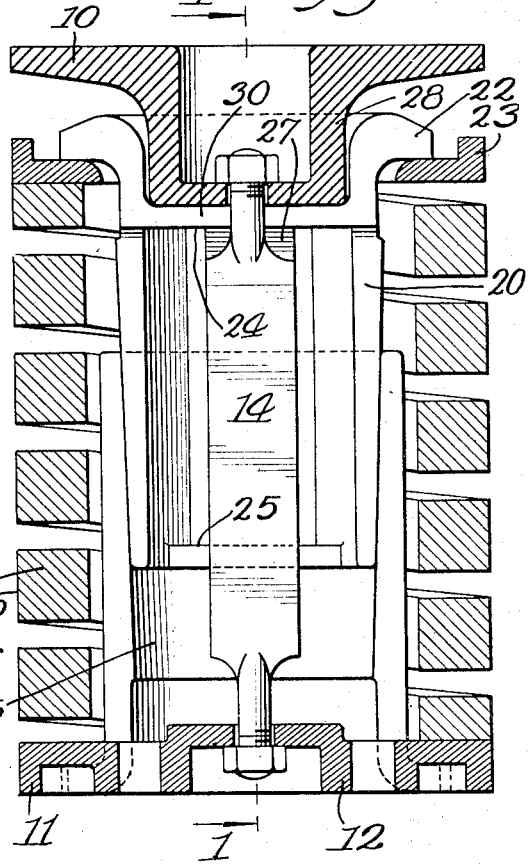
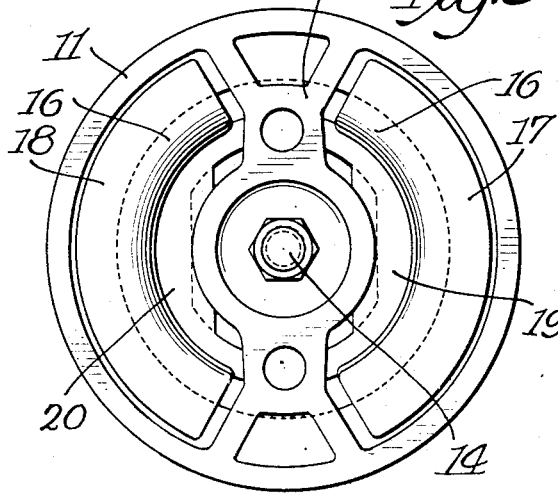
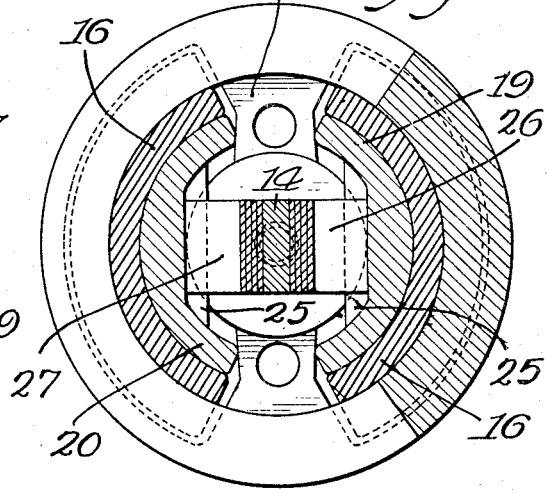
Inventor
Donald F. Sproul
By Gibson, Mann & Ettys.

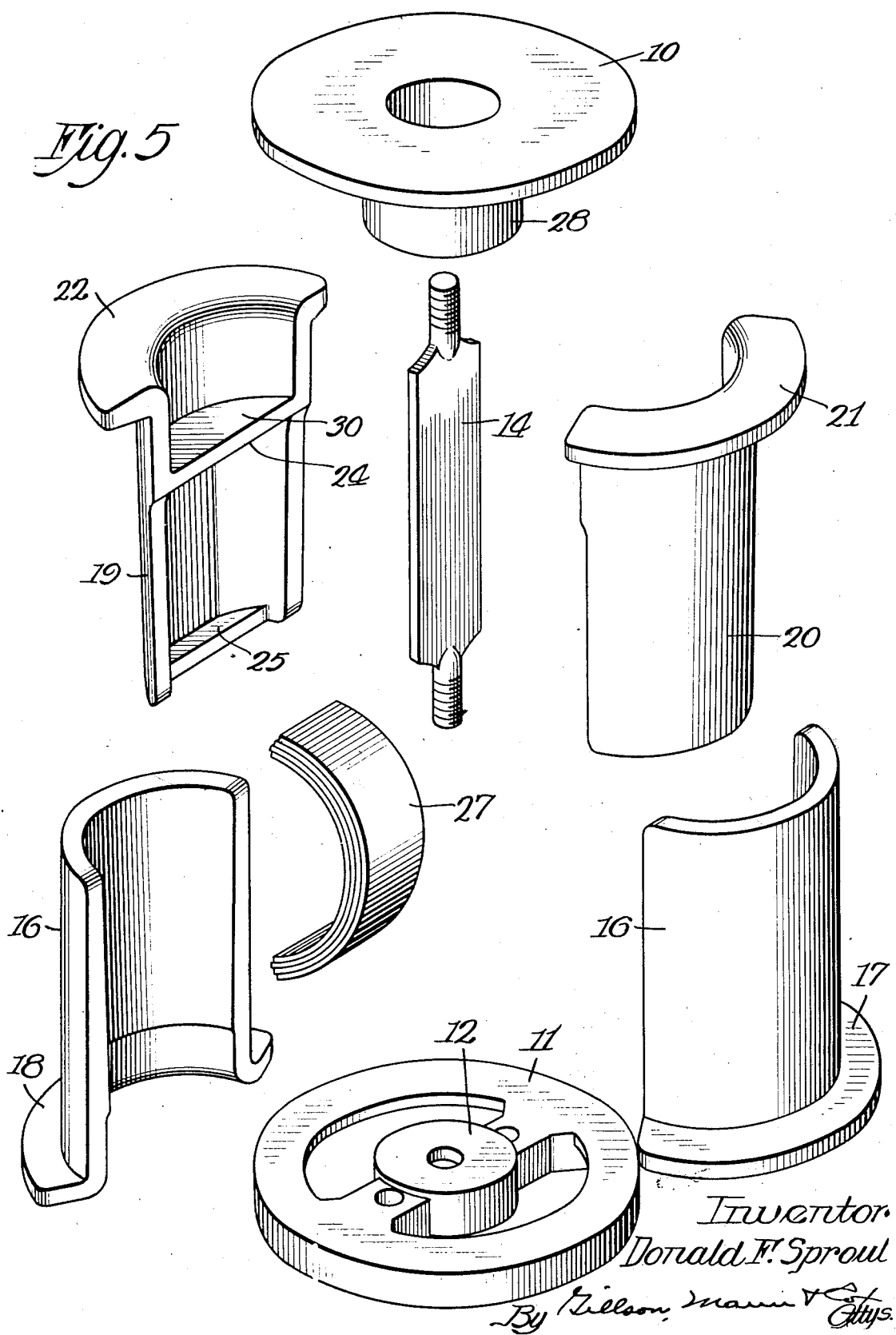

Patented Oct. 17, 1933

1,930,695

UNITED STATES PATENT OFFICE 1,930,695

CUSHIONING DEVICE

Donald F. Sproul, Chicago, Ill., assignor to Cardwell Westinghouse Company, a corporation of Delaware Application July 7, 1931. Serial No. 549,287

1 Claim. (Cl. 267—9)

The invention consists of a cushioning device especially adapted for use in supporting the truck bolsters of cars, its object being to provide for the resistance of shocks in part by a main spring and in part by friction of constant intensity.

In the accompanying drawings,

Fig. 1 is a longitudinal central section of the device on the line 1—1 of Fig. 2;

Fig. 2 is a similar view on the line 2—2 of Fig. 1;

Fig. 3 is an end view of the device;

Fig. 4 is a sectional view on the line 4—4 of Fig. 1; and

Fig. 5 is a group of various elements of the device, shown in perspective.

At 10, 11, there is shown a pair of end followers, the upper one, 10, being in the form of a circular plate having a central instanding boss 28, which constitutes a thrust element. The follower 11, shown as annular in form and having a diametrical bridge 12, is provided with an outwardly opening central pocket. A retaining bar 14, located on the axis of the device, passes through the floor of the thrust element 28 and the bridge 12, and carries nuts at its end portions.

A spring barrel 15, the inner faces of the several coils of which are flattened to provide a cylindrical friction surface, is seated on the follower 11. A cylindrical casing 16, preferably in segmental form, frictionally engages the interior of the barrel and is anchored to the follower 11, being provided with outstanding lugs 17, 18, engaging under shoulders of the follower.

A pair of friction shoes 19, 20, project into the inner end of the barrel and are anchored to the free end of the spring 15 by means of outstanding lugs 21, 22, engaging over an annular spring seat 23. Each of the shoes is provided in its inner face with a pair of shoulders 24, 25, between which are housed groups 26, 27, of bowed spring plates, the two groups reacting against each other through the medium of the bar 14, which is flattened to form friction surfaces.

The thrust element 28 bears upon a pair of flanges 29, 30, projecting inwardly from the shoes, these flanges, in the construction disclosed, providing the shoulders 24.

The two groups of spring plates are normally shorter than the distance between the shoulders 24, 25. In assembling the device these spring plates are flattened to bring their ends into engagement with the shoulders, and are consequently under constant tension. As the spring plates tend to assume their normal curvature they exert a constant radial pressure upon the shoes, urging them into intimate contact with the casing, and when, as shown, the casing is comprised of a pair of segments also urging them radially into more intimate contact with the spring 15.

Upon the relative approach of the followers 10, 11, the shoes 19, 20, are advanced into the casing 16 and the spring 15 is compressed. The bar 14 is carried downwardly by reason of the frictional grip upon it of the bowed springs, until its end reaches the support upon which the cushioning device rests. Thereupon the bowed springs travel downwardly with reference to the bar against the frictional resistance at the points of contact. The inward movement of the shoes 19, 20, is resisted by the friction developed between them and the casing 16, and frictional resistance to the compression of the device is also developed between the spring 15 and the casing 16. The tapering form of the shell 16 and shoes 19, 20, causes radial expansion of the spring 15; the springs 26, 27, however, remaining unchanged in form, and consequently not increasing their spring pressure. If desired the relative resistance of the springs 26 and 27, as compared with 15, may be such that under heavy shocks there will be a distortion of their end portions, thus increasing their spring resistance.

Upon release the parts are restored by the action of the spring 15.

I claim as my invention—

In a cushioning device, in combination, a follower, a spring barrel seated on the follower and having a smooth internal cylindrical surface, a pair of segmental shoes anchored at the seated end of the barrel and frictionally engaging its inner surface, a pair of segmental shoes anchored to the opposite end of the barrel and being in frictional engagement with the first-named shoes, each of the second-named pair of shoes having a pair of oppositely facing shoulders on its inner side, a group of radial inwardly bowed springs interposed between the shoulders of each shoe, a follower bearing on the second-named shoes, and a friction bar extending loosely through both followers and being interposed between the groups of bowed springs.

DONALD F. SPROUL.